United States Patent [19]
Schnizler et al.

[11] Patent Number: 5,697,279
[45] Date of Patent: Dec. 16, 1997

[54] APPARATUS FOR CLAMPING THE END OF A SAW BLADE

[75] Inventors: Albrecht Schnizler; Manfred Schulz, both of Nürtingen; Jörg Seyerle, Köngen, all of Germany

[73] Assignee: Metabowerke GmbH & Co., Nurtingen, Germany

[21] Appl. No.: 662,689

[22] Filed: Jun. 13, 1996

[30] Foreign Application Priority Data

Jun. 19, 1995 [DE] Germany ............ 195 21 762.4

[51] Int. Cl.⁶ .................................... B23D 51/08
[52] U.S. Cl. .................... 83/698.31; 30/338; 83/699.21
[58] Field of Search ............ 83/699.21, 698.31, 83/698.91, 698.71; 30/337, 338, 339

[56] References Cited

U.S. PATENT DOCUMENTS

| | | | |
|---|---|---|---|
| 1,179,476 | 4/1916 | Thomas | 83/698.91 |
| 1,361,021 | 12/1920 | Copeman | 30/337 |
| 3,750,283 | 8/1973 | Hoffman | 83/698.71 |
| 3,823,473 | 7/1974 | Hoffman | 83/698.71 |
| 3,845,554 | 11/1974 | Joanis et al. | 30/339 |
| 3,935,889 | 2/1976 | Derbyshire | 30/339 |
| 4,106,181 | 8/1978 | Mattchen | 83/699.21 |
| 4,174,648 | 11/1979 | Wallis | 83/698.31 |
| 4,377,100 | 3/1983 | Wallis | 83/698.31 |
| 4,528,753 | 7/1985 | Kuhlmann et al. | 83/698.31 |
| 4,594,781 | 6/1986 | Hoffman | 83/698.31 |
| 5,322,302 | 6/1994 | Quirijnen | 30/338 |
| 5,324,052 | 6/1994 | Ortmann | 30/339 |
| 5,363,733 | 11/1994 | Baird et al. | 83/699.21 |
| 5,433,457 | 7/1995 | Wright | 30/337 |
| 5,443,726 | 8/1995 | Nasser et al. | 83/699.21 |
| 5,458,346 | 10/1995 | Briggs | 83/699.21 |
| 5,487,221 | 1/1996 | Oda et al. | 83/699.21 |
| 5,575,071 | 11/1996 | Phillips et al. | 30/337 |

FOREIGN PATENT DOCUMENTS

| | | | |
|---|---|---|---|
| 690835 | 7/1964 | Canada | 83/698.91 |
| 114589 | 10/1900 | Germany | 83/699.21 |

*Primary Examiner*—Kenneth E. Peterson
*Assistant Examiner*—Sean A. Pryor
*Attorney, Agent, or Firm*—Charles E. Baxley, Esq.

[57] ABSTRACT

An apparatus includes a clamping body which includes a lever which bears against a saw blade inserted into the clamping body. A tension spring is connected to the lever and to the clamping body and the tension spring bears against a pin which is slideably mounted in the clamping body. The pin bears against the saw blade and moves the saw blade out of engagement with form-lock projections in the clamping body when the lever is moved to an unlocked position.

4 Claims, 1 Drawing Sheet

APPARATUS FOR CLAMPING THE END OF A SAW BLADE

BACKGROUND OF INVENTION

The present invention relates generally to the field of saws and, more particularly, to an apparatus for clamping the end of a saw blade.

The prior art includes devices for the clamping or securing of the ends of saw blades using a form-locked feature so that the saw blade is reliably carried along in the direction of its motion, particularly in the pulling direction, by the clamping body which is movable back and forth and which is seated on a machine ram. The generally flat clamping end of the saw blade, which is also known as the tang, for this purpose has protruding flanges on opposite sides which hook or engage with securing contours in the clamping body. For this purpose, the clamping end is inserted into a receiving device in the longitudinal direction of the saw blade and, upon coming against a stop provided for the protruding flange on the clamping end, is displaced transverse to the plane of the saw blade, whereupon the form-lock is produced between the clamping end of the saw blade and the securing contours adjacent the resting surface in the clamping body. In this form-locking position, the clamping end of the saw blade is acted on by the clamping body which is displaceable relative to the resting surface.

One disadvantage in operating clamping devices of the above mentioned type is that, after the clamping body has been loosened, the saw blade can frequently not be brought out of the securing form-lock without cumbersome manipulations because, depending on the different thickness of the saw blade or its clamping end, a greater or lesser amount of space is available for the displacement of the saw blade transverse to the plane of its blade within the receiving device. For this reason, particularly in the case of thicker saw blades, the engagement of the clamping end with the securing devices in the clamping body cannot be freed if the saw blade is merely tilted slightly with respect to the direction of the stroke.

OBJECTS AND SUMMARY OF INVENTION

It is the primary object of the present invention to provide an apparatus for clamping the end of a saw blade in which the saw blade is automatically moved out of a form-locked engagement when a clamping body is released.

Another object of the present invention is to provide an apparatus for clamping the end of a saw blade which is capable of easily releasing the saw blade when the apparatus is unlocked.

The foregoing and other objects and advantages of the present invention will appear more clearly hereinafter.

In accordance with the present invention there is provided an apparatus for clamping the end of a saw blade which includes a clamping body which includes a resting surface and projection portions which engage recessed portions of a saw blade which is inserted into the clamping body. The projecting portions are formed on a ram member in the clamping body. The projecting portions create a form-lock between the saw blade and the clamping body. A lever member is pivotally mounted on the clamping body. A shorter end of the lever has an eccentric cam portion formed thereon which bears on the saw blade and locks the saw blade. A tension spring is attached to the lever and to the clamping body. The tension spring is attached to the lever and to the clamping body. The tension spring bears against a slideably mounted pin and the pin bears against the saw blade and forces the saw blade away from the projecting portions and the resting surface, thereby freeing the saw blade when the lever is moved to an unlocked position.

BRIEF DESCRIPTION OF THE DRAWINGS

Other important objects and advantages of the present invention will be apparent from the following detailed description of the invention, taken in conjunction with accompanying drawings in which.

DETAILED DESCRIPTION OF THE INVENTION

Figure 1:
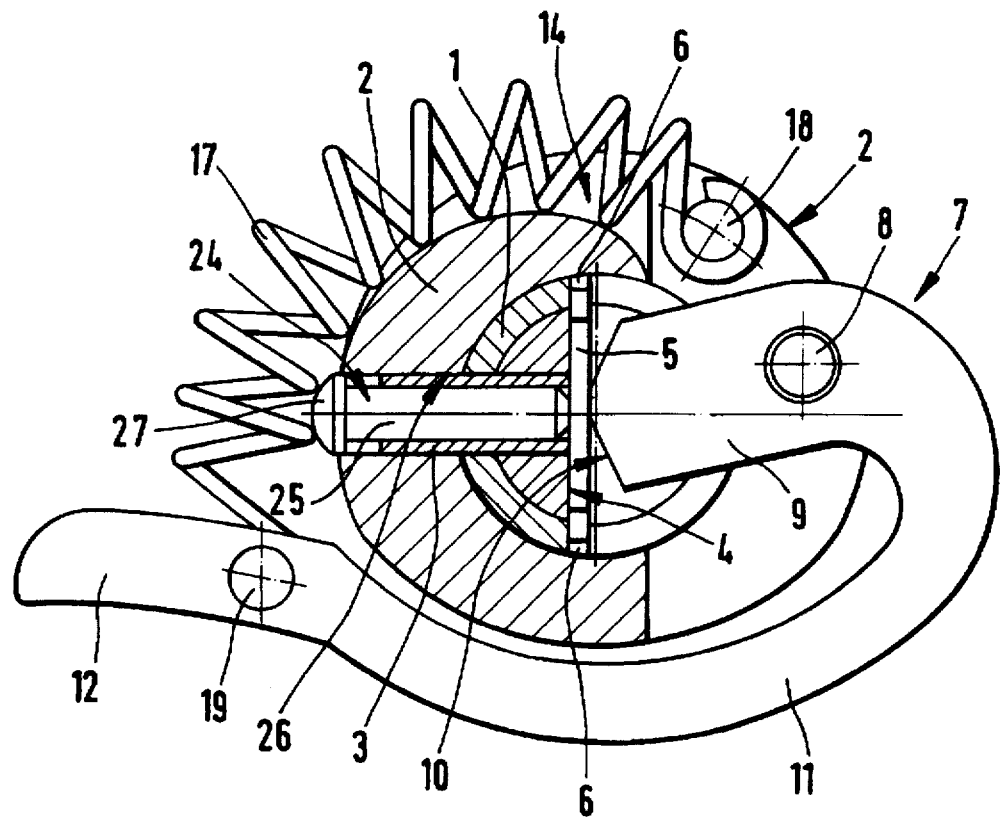
FIG. 1 is a cross-sectional view of an apparatus for clamping the end of a saw blade, made in accordance with the present invention, taken along line 1—1 of FIG. 2.

With reference to the drawings, wherein like reference numbers designate like or corresponding parts throughout, there is shown in FIG. 1 an apparatus for clamping the end of a saw blade generally designated by reference number 100.

Figure 2:
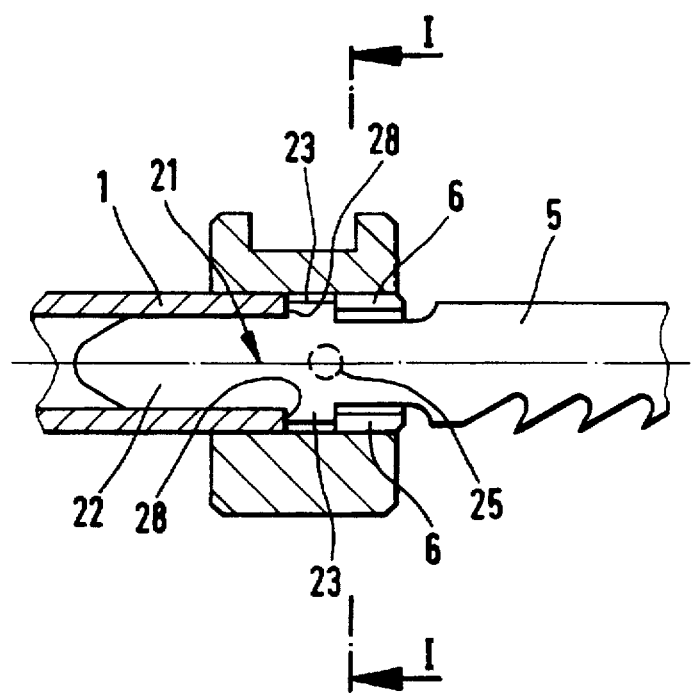
FIG. 2 is a longitudinal cross-sectional view of the apparatus of FIG. 1.

FIGS. 1 and 2 shows the bottom end of a ram 1 of a keyhole saw blade 5, the clamping end 22 of which is clamped in the apparatus according to the present invention. The ram 1 is firmly attached to clamping body 2 via which the clamping forces are applied. The keyhole saw blade 5 is fixed in the clamping apparatus 100 so that it lies essentially in the diametral plane of the ram 1. The clamping body 2 has a cylindrical envelope shape which is coaxial to the ram 1.

Approximately in the diametral plane of this cylindrical envelope shape of the clamping body 2, and thus in the diametral plane of the ram 1, a resting surface 4 is formed on the latter, against which surface the clamping end 22 of the saw blade 5 can be brought to rest. The saw blade 5 is in engagement with securing contours, such as securing projections 6 which secure the saw blade 5 in its clamped position, resting against the resting surface 4 against displacement in the stroke direction, as shown in FIG. 2. For this purpose, the saw blade 5 is provided with laterally protruding form-lock members 23 in the shape of protruding flanges which, in the clamped position, rest against the securing projections 6 on the side facing away from the entrance side of the saw blade 5. The form-lock members 23 are in the plane of the saw blade 5.

In order to reach the position shown in FIG. 2, the saw blade 5 is inserted in its longitudinal direction into the apparatus 100 so that, in its inserted end position, its protruding flanges 23 come against stop edges 28 which are formed by the end of the ram 1. The collision of these protruding flanges 23 with the securing projections 6 adjacent the stop surface 4 is avoided because the saw blade 5 can be pushed in a direction parallel to the diametral plane in which the stop surface 4 lies, so that upon the introduction the protruding flanges 23 can be moved past the securing projections 6. The clamping end 22 of the saw blade 5 is then pushed parallel to the diametral plane towards the resting surface, whereby the protruding flanges 23 engage behind the securing projections 6.

The clamping of the clamping end 22 of the saw blade 5 against the resting surface 4 is effected by means of a double-armed C-shaped lever 7 which is mounted on a mounting pin forming a pivot shaft 8. A center line of the saw blade 5 is designated 21. The pivot shaft 8 of the lever 7 is arranged, spaced from the resting surface 4, parallel to the axis of the stroke. From the pivot shaft 8 there extends into the inside of the clamping body 2 an inner arm 9 of the lever 7 which has an eccentric cam 10 on its inner end. By swinging the lever 7 around the pivot shaft 8, the eccentric cam 10 of the inner arm 9 thereof can be brought to rest against the clamping end 22 of the saw blade 5.

The eccentricity of the cam 10 is with reference to the pivot shaft 8. As a result, a clamping force which is closed over, or applied over, the clamping body 2 is produced via the inner arm 9 and the clamping end 22 of the saw blade 5 between the pivot shaft 8 and the resting surface 4.

The lever 7 furthermore has an outer arm 11, the active length of which is substantially greater than that of the inner arm 9 of the lever 7. The outer arm 11 extends with a strong curvature directly from the pivot shaft 8 towards the inside and then assumes an arcuate shape which is adapted to the outer rounding of the clamping body 2. Thus, the more weakly curved region of the outer arm 11 of the lever 7 extends, upon the clamping of a thinner saw blade 5, approximately concentrical to the axis of the stroke, while upon the clamping of a thicker saw blade, the outer arm 11 of the lever 7 is lifted further off from the circumferential side of the clamping body 2. In the open position of the lever 7, the outer arm 11 protrudes from the circumferential side of the clamping body 2 and the inner arm 9, and the eccentric cam 10 swings away from the stop surface 4, releasing the clamping end of the saw blade 5. Thereupon, the clamping end 22 of the saw blade 5 can be lifted so far from the resting surface 4 so that the form-lock between the protruding flanges 23 on the clamping end 22 of the saw blade 5 and the securing projections 6 on the ram 1 is eliminated.

The generally approximately "C"-shaped lever 7 has a free handle end 12 which can be bent off slightly outwards opposite the C-curvature so that even in its position lying almost against the clamping body 2, the handle end 12 can be easily grasped.

Near the handle end 12 a tension spring 17, connected to the handle end 12 by means of a pin 19, acts on the outer arm 11 of the lever 7, being arranged substantially along the circumference of the clamping body 2 and being held there by means of a fastening pin 18. In part, the tension spring 17 can extend into an incision 14 in the clamping body 2 in which the fastening pin 18 is arranged, depressed as seen in radial direction. The same applies also to the mounting pin 8 on which the lever 7 is mounted. Thus, the tension spring 17 urges the outer arm 11 of the lever 7 towards the clamping body 2, resulting in the inner arm 9 of the lever 7 being brought into its clamping position in which the eccentric cam 10 on its end can act on the clamping end 21 of the saw blade 5.

As seen particularly in FIG. 1, a lift-out device 24, which has an axially displaceable pin 25, is arranged in the clamping body 2 in the receiving end of the ram 1. This pin 25 is seated in a hole 26 which is open towards the resting surface 4. The hole 26 is developed as a continuous hole and, accordingly, has an opening towards the circumferential side of the clamping body 2 which forms a place of emergence for the pin 25. The hole 26 at the same time receives the clamping sleeve 3 which connects the clamping body 2 and the receiving side end of the ram 1 to each other. Accordingly, the axially displaceable pin 25 is guided in this clamping sleeve 3, the axis of which lies in a direction radial to the direction of the stroke and is thus perpendicular to the resting surface 4.

At the place of emergence, at the outer opening of the passage hole 26, the pin 25 has a head 27 which is rounded or barrel-shaped and can pass into the passage hole 26 without it colliding with the clamping sleeve 3.

The tension spring 17 passes over the head 27 of the pin 25 and strikes with at least one turn against the head 27 of the pin 25. As a result, the pin 25 is urged to move inward so that its inner end protrudes out of the resting surface 4. The force of displacement exerted by the tension spring 17 on the pin 25 is greater the further that lever 7 is swung in the direction of release, so that the strongest action of displacement is obtained when the inner arm 9 of the lever 7 has again released the clamped saw blade 5.

Thus, with the inner arm 9 of the lever 7 lifted off from the saw blade or its clamping end 22 by means of its eccentric cam 10, the clamping end 21 can be displaced, via displacement of the pin 25, transverse to the plane of its blade to such an extent that the protruding flanges 23 on the clamping end 22 of the saw blade 5 come free from the form-lock with the securing projections 6 on the end of the ram 1.

This is particularly easy to effect because the pin 25, which is acted on by the tension spring 17, lies as shown in FIG. 2 at the height of the form-lock and therefore approximately at the height of the protruding flanges 23 serving as form-lock members on the clamping end 22 of the clamped saw blade 5.

The foregoing specific embodiments of the present invention as set forth in the specification herein are for illustrative purposes only. Various deviations and modifications may be made within the spirit and scope of this invention, without departing from the main theme thereof.

We claim:

1. An apparatus for clamping an end of a reciprocating saw blade having a longitudinal direction and a transverse direction, the apparatus comprising:

a clamping body;

a resting surface formed on said clamping body;

a plurality of securing projection means formed on said resting surface for the purpose of engaging said reciprocating saw blade;

clamping member means mounted on said clamping body, with said clamping member means capable of a position in which said clamping member means are clamped against said resting surface and capable of a position lifted off from said resting surface;

lift-off means, mounted on said clamping body, capable of imparting transverse motion to said saw blade for the purpose of lifting said saw blade away from said plurality of securing projection means;

a spring-loaded pin, with said spring-loaded pin slideably mounted in said clamping body;

said clamping means comprising a lever member mounted on said clamping body having a shorter arm, with said shorter arm bearing on an eccentric cam, and a longer arm, an eccentric cam formed on said shorter arm and disposed adjacent to said saw blade;

a tension spring having a first end and a second end and an intermediate portion with said first end connected to said clamping body, with said second end connected to said longer arm of said lever body, with said intermediate portion of said tension spring bearing on said pin, with said tension spring extending in circumferential direction around said clamping body, and with said tension spring urging said lever member to bear against said saw blade, causing said saw blade to bear against said resting surface.

2. The apparatus according to claim 1, in which said reciprocating saw blade comprises at least one projecting form-lock portion and in which said spring loaded pin is disposed in general alignment with said projecting form-lock portion.

3. The apparatus according to claim 1, in which said pin comprises a rounded end formed thereon.

4. The apparatus according to claim 1, further comprising:
a ram member mounted in said clamping body; and
a sleeve member mounted in said clamping body and connecting said clamping body and said ram member, with said pin slideably mounted in said ram member.

* * * * *